United States Patent [19]

Dalmaso

[11] Patent Number: 4,560,029
[45] Date of Patent: Dec. 24, 1985

[54] SECURITY DEVICE
[75] Inventor: George C. Dalmaso, Polk, Pa.
[73] Assignee: WGM Safety Corp., Franklin, Pa.
[21] Appl. No.: 645,448
[22] Filed: Aug. 29, 1984
[51] Int. Cl.⁴ .......................... A62B 1/14; B65H 59/16
[52] U.S. Cl. ........................................ 182/5; 182/192; 182/112; 188/65.2
[58] Field of Search ........................................ 182/5–8, 182/112, 191, 192; 188/188, 65.2, 65.1

[56] References Cited

U.S. PATENT DOCUMENTS

| 527,529 | 10/1894 | Leber | 188/65.2 |
|---|---|---|---|
| 1,300,752 | 4/1919 | Mattern | 182/5 |
| 2,205,933 | 6/1940 | Silvia | 182/112 |
| 2,272,494 | 2/1942 | Winslow | 182/112 |
| 2,561,514 | 7/1951 | Houseman | 182/5 |
| 3,504,763 | 4/1970 | Rabelos | 182/7 |
| 3,876,036 | 4/1975 | Sweet | 182/5 |
| 4,034,828 | 7/1977 | Rose | 188/65.2 |
| 4,253,218 | 3/1981 | Gibbs | 182/5 |

Primary Examiner—Reinaldo P. Machado
Attorney, Agent, or Firm—Charles H. Lindrooth; Richard D. Weber

[57] ABSTRACT

A security device for providing a detachable and adjustable connection of a workman's safety belt lanyard to a safety line or the like. The device includes a pair of vertically spaced pivotally mounted cams having serrated cam faces directed into a vertical channel adapted to receive a safety line. The cams are joined by a link to maintain their parallel relation and are spring loaded toward a line engaging position. A pivoted eye connected to the link provides an attachment point for a lanyard. The frame of the device includes pivotally connected front and rear frame portions which may be opened to apply the device to or remove it from a safety line. A latch mechanism provides a secure locking of the frame portions in their closed line clamping position, but may be readily released to allow removal of the device from a line.

7 Claims, 9 Drawing Figures

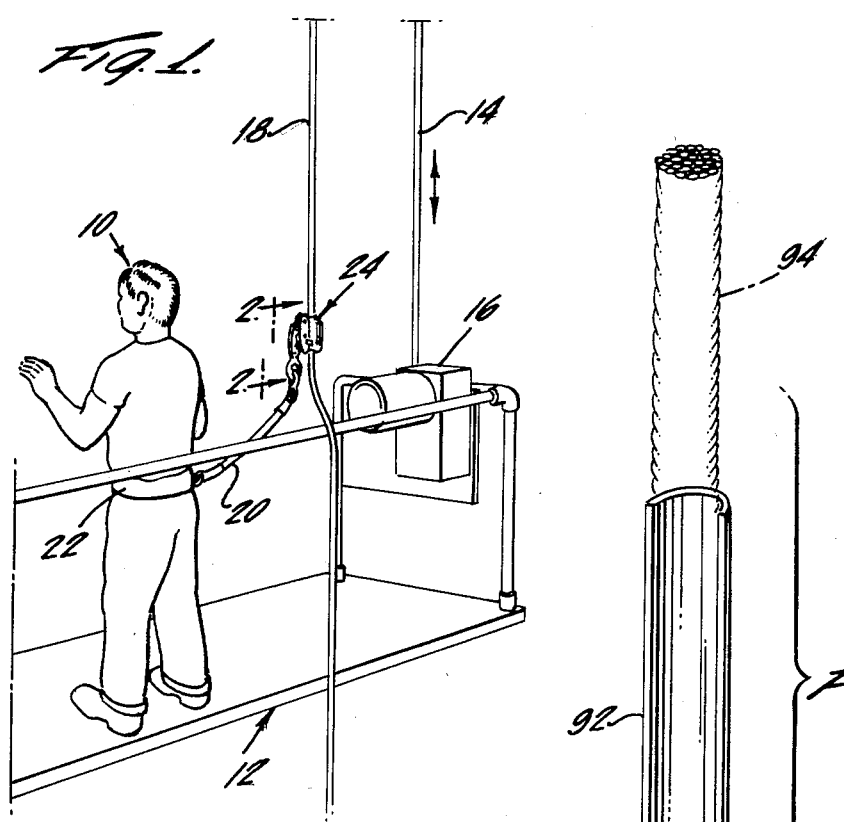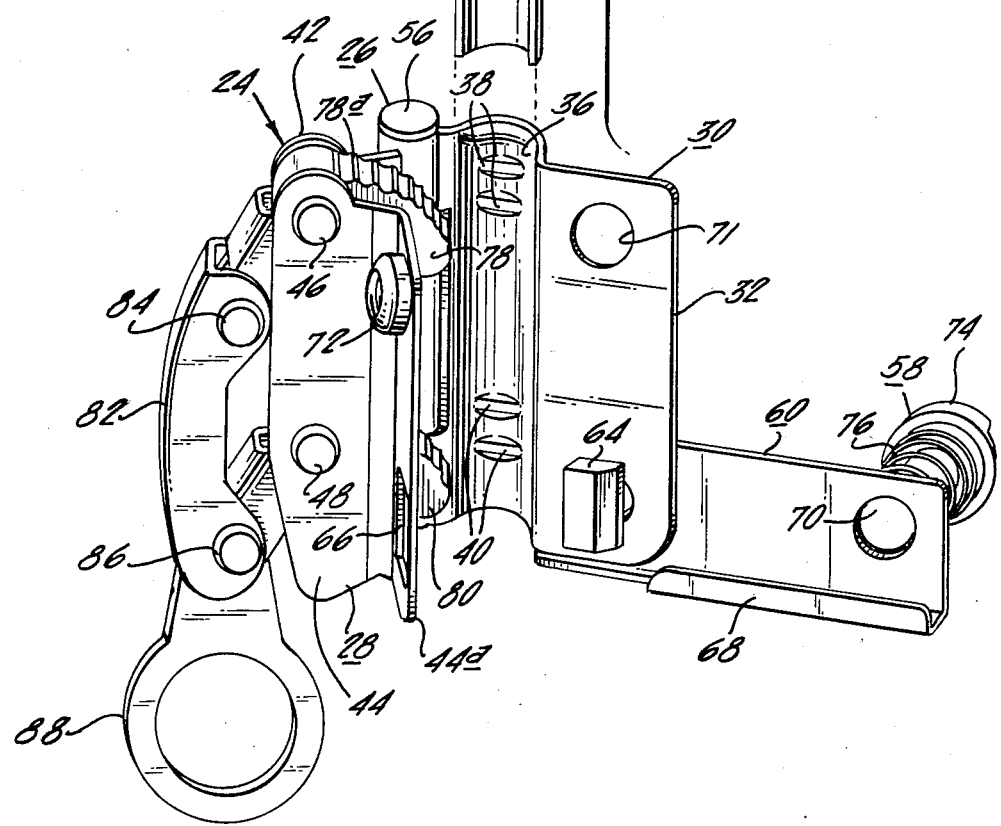

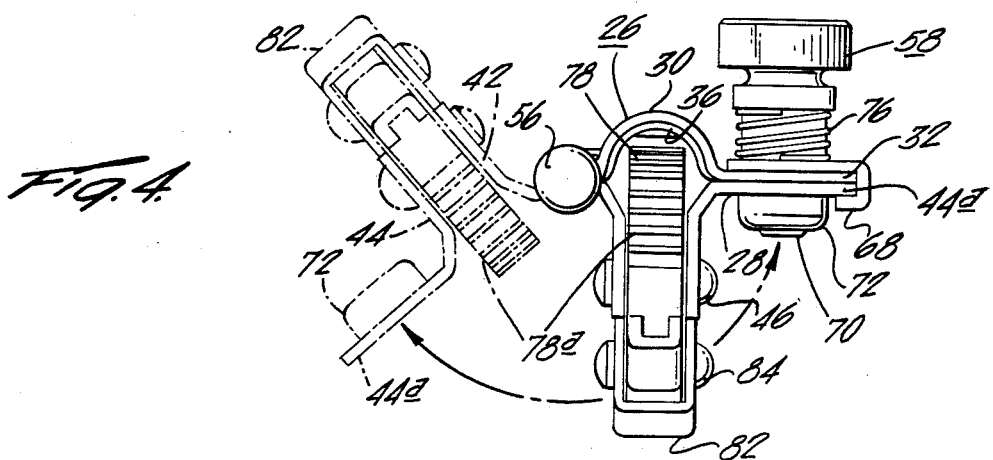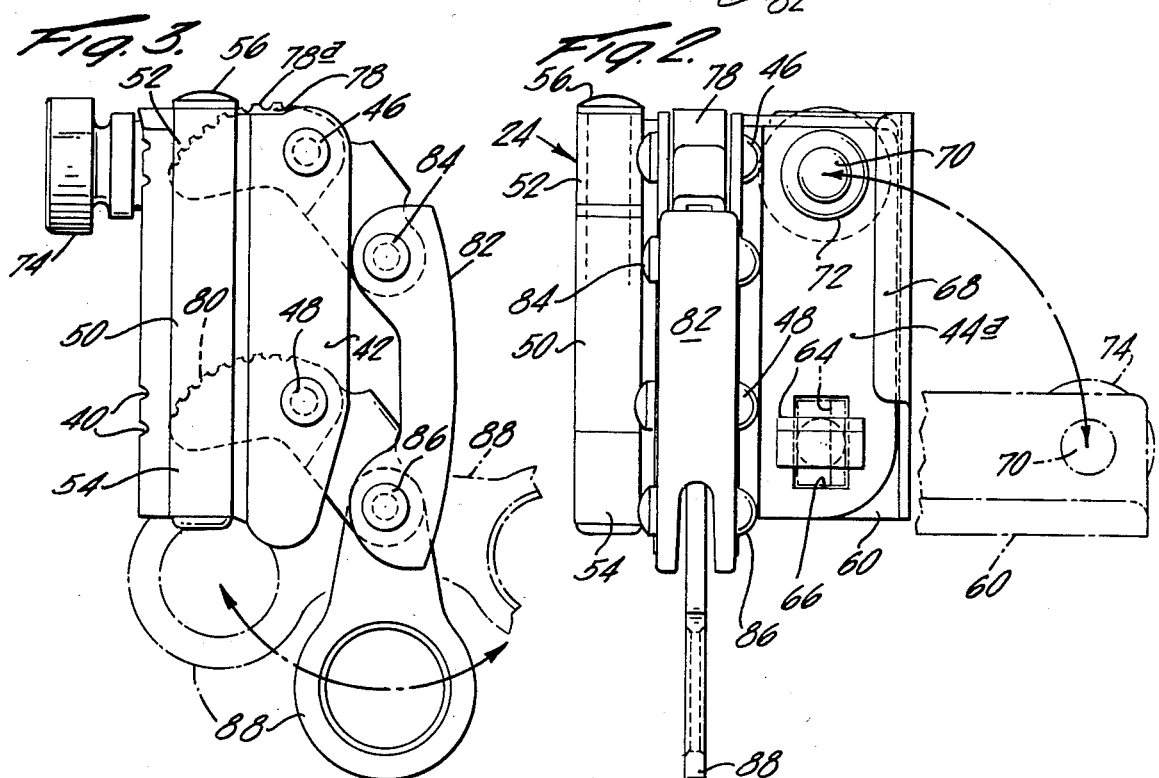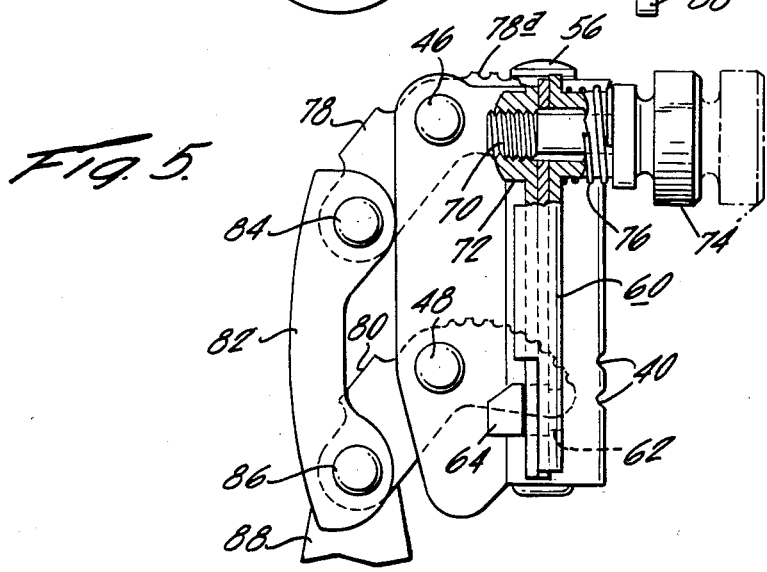

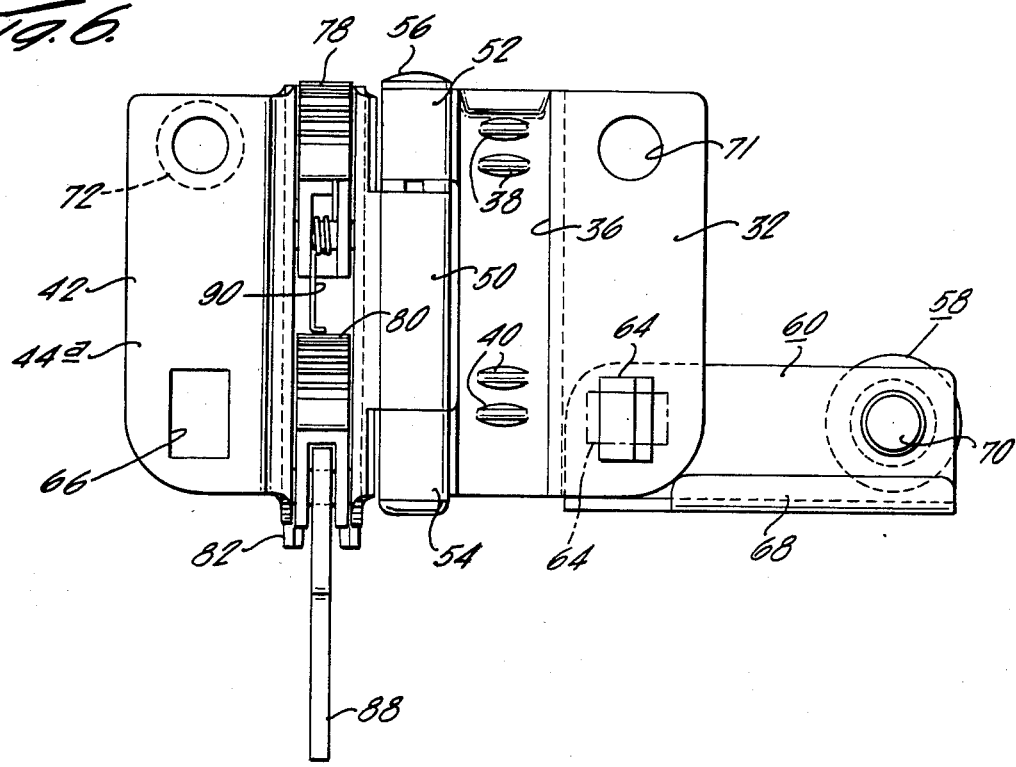
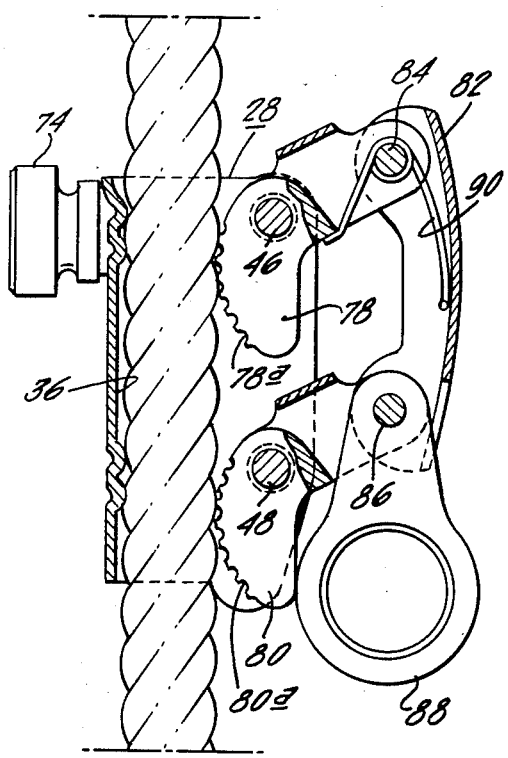
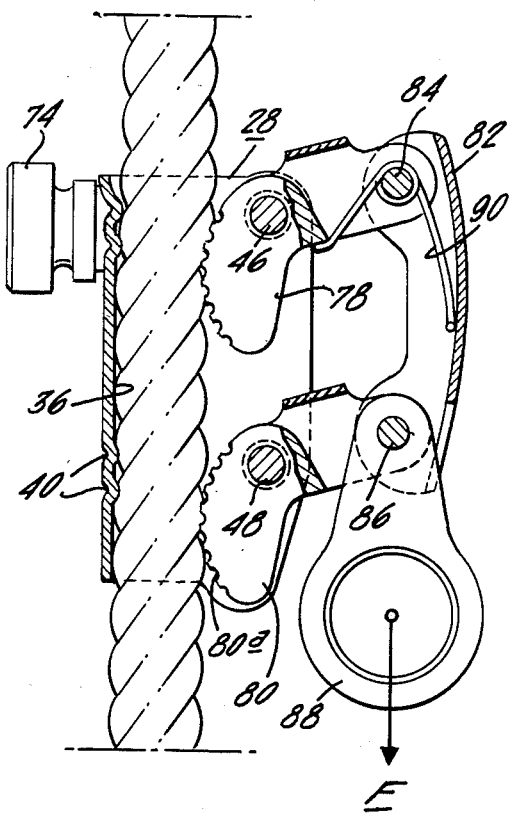

SECURITY DEVICE

BACKGROUND OF THE INVENTION

The present invention relates generally to security devices for preventing the fall of workers employed on scaffolds, ladders and similar hazardous elevated work platforms. More particularly, the invention relates to a security device for connecting a worker's safety belt lanyard to a safety line to arrest the fall of the worker should the work platform fail or should the worker slip from the platform.

In early times, workers employed at elevated work stations relied primarily on the integrity of the work platform for their personal safety. Those employed on movable scaffolds, for example would secure themselves by means of a safety belt and lanyard to the scaffold but were subject to injury should the scaffold itself fail. In recent years, attention to personal safety has increased, culminating in legislated regulations which specify the neccessary safeguards to be employed in hazardous activities. For those exposed to the inherent danger of falling from elevated work platforms, it is now standard practice to provide separate personal safety lines completely independent of the work platform to which the worker is attached by a lanyard and safety belt. In the event of a platform failure or the worker's slippage from the platform, the safety line will prevent the worker from falling.

The device connecting the worker's lanyard to a safety line must when released automatically station itself on the line and provide a mechanism for clamping the line securely under the weight of the worker should the worker fall. The device further should be readily adjustable along the line to accommodate changes in the worker's elevation, for example as he rises or descends on a motorized scaffold. Another desired feature of such device is that it be attachable and releasable from a standing part of the line without having to thread the entire line through it for each application.

Devices previously proposed for this purpose have, for the most part, been designed to carry out the above described functions but the mechanisms employed have suffered from undue complexity, inadequate rope gripping capability, cumbersome operating mechanisms for attaching or releasing the device to a line or other shortcomings. For example, a number of prior devices have utilized one or more pins which must be pushed through aligned bores in separable parts of the device to attach the device to a line. Not only can the alignment of parts be difficult and time consuming, but the improper securing of the pins as well as unnoticed pin wear may adversely affect the security of such devices. In addition, prior devices have to a large degree operated in a fall situation by applying a severe pinching action at a single concentrated point on the line with a consequent danger of chafing or cutting the line.

BRIEF SUMMARY OF THE INVENTION

The present invention provides a security device for providing a readily detachable, adjustable connection of a workman's safety belt lanyard to a safety line or the like. The device includes a frame assembly formed of front and rear frame portions pivotally joined along a vertical pivot axis at one side thereof. The rear frame portion includes a vertically extending channel for receiving a safety line. The front frame portion pivotally supports a pair of vertically spaced upper and lower cams having cam surfaces extending into the channel to engage a line disposed therein. A link pivotally connected to the outer end of the cams maintains a parallel relationship of the cams and a uniform engagement of the cam surfaces with the line. A spring is provided to rotationally bias the cams toward a line engaging position and thus prevents sliding of the device along a line when released. A ring pivotally connected to the cam linkage provides a connection point for the worker's lanyard. Should the worker fall, the downward force on the attachment ring pivots both cams simultaneously into a locking engagement with the safety line. The gripping of the line at two spaced points therein maintains the vertical position of the line under stress and thus minimizes chafing or cutting of the line strands.

The front and rear frame portions are readily locked and released by a latching mechanism which includes a latch plate pivotally mounted on one of the frame portions for rotation through 90° from a locked to an unlocked position. In the locked position, the rectangular head of the latch plate pivot extends through a larger rectangular slot in the opposed frame member but is disposed at a 90° angle to the slot and thus prevents separation of the frame members. In addition, a channel-shaped flange on the latch plate side edge overlaps the opposed frame portion in the locked position further preventing pivotal movement of the opposed frame portions. A lock screw captively mounted on the free end of the latch plate cooperates in the locked position of the plate with a threaded bore in the opposed frame member to permit a positive locking of the plate in the frame closing position.

It is accordingly a first object of the present invention to provide a security device for providing a readily detachable and adjustable connection of a workman's safety belt lanyard to a safety line or the like.

A further object of the invention is to provide a device as described which may be easily applied to and removed from a safety line.

Another object of the invention is provide a device as described which clampingly engages a safety line at two vertically spaced points, thus assuring a parallel alignment of the device with the line and minimizing the chafing or cutting of the line.

Another object of the invention is provide a device as described which may be quickly and easily moved along the line to accommodate a change in the worker's position.

A still further object of the invention is to provide a device as described which will operate either with synthetic rope or, with minor modification, steel cable or rod.

Still another object of the invention is to provide a device as described of a relatively simple construction which can be economically manufactured.

Additional objects and advantages of the invention will be more readily apparent from the following detailed description of the preferred embodiment thereof.

BRIEF DESCRIPTION OF THE DRAWINGS

FIG. 1 is a perspective view showing a worker on an elevated platform secured to a safety line by means of a security device in accordance with the present invention;

FIG. 2 is an enlarged front elevational view of the device taken along line 2—2 of FIG. 1 showing in dot/-dash lines the open position of the latch mechanism;

FIG. 3 is a left side elevational view of the device shown in FIGS. 1 and 2;

FIG. 4 is a plan view of the device shown in FIGS. 1-3 showing in dot/dash lines the open position of the front frame portion;

FIG. 5 is a right hand elevational view of the device shown in FIGS. 1-4 partly broken away and in section;

FIG. 6 is a front view of the device shown in FIGS. 1-5 in the open position;

FIG. 7A is a sectional side elevational view of the device shown in FIGS. 1-6 applied to a safety line;

FIG. 7B is a view as in FIG. 7A with the workman's weight supported by the device; and FIG. 8 is an exploded perspective view of a device similar to that of FIGS. 1-7 but modified to accept a metal cable.

DESCRIPTION OF THE PREFERRED EMBODIMENT

Referring to the drawings, and particularly FIG. 1 thereof, a workman 10 is shown on an elevated work platform in the form of a motorized scaffold 12 suspended at each end by a cable 14. The height of the scaffold may be selectively adjusted by means of the motorized winch 16 acting on the cable 14.

To prevent the worker from plunging to the ground should he slip from the scaffold or should the scaffold itself fall, a safety line 18 securely attached at its upper end is provided contiguous the platform and to which the worker is loosely connected by means of lanyard 20 attached to a safety belt 22 about the worker's waist. A security device 24 in accordance with the present invention provides a detachable and adjustable connection of the lanyard to the safety line 18 and tightly clamps onto the safety line in the event of a fall of the worker.

The security device 24 as shown in FIGS. 2-6 comprises a frame generally designated 26 formed of front and rear frame portions 28 and 30 respectively. The rear frame member comprises a vertically oriented substantially rectangular plate 32 which as shown most clearly in FIG. 4 includes a vertically extending half-round curved portion 34 therein which defines an internal channel 36 on the inner side thereof for receiving a safety line such as the line 18 shown in FIG. 1. Horizontal ribs 38 and 40 interrupt the smooth walls of the channel 36 respectively at the upper and lower ends thereof for a purpose to be described herebelow.

The front frame portion 28 comprises a pair of horizontally spaced vertically oriented frame members 42 and 44 which are maintained in spaced relation by upper and lower rivets 46 and 48 passing respectively through bushings 46a and 48a. Frame member 42 along its inner edge is formed to provide a hinge knuckle 50 disposed between upper and lower hinge knuckle portions 52 and 54 of plate 32. Hinge pin 56 passing through the knuckles 50, 52 and 54 is permanently secured such as by upsetting the ends thereof to provide a permanent pivotal connection of the front and rear frame portions 28 and 30. The device may accordingly be opened from its normally closed operating position such as shown in FIGS. 2-5 to an opened position as shown in FIG. 6 to permit its attachment or removal from a safety line.

The front and rear frame portions 28 and 30 are locked into the operating position shown in FIGS. 2-5 by means of a latch assembly 58 comprising a latch plate 60 pivotally connected at one end thereof to the lower corner of the rear frame plate 32 by pivot pin 62. The inner head 64 of the pin 62 is rectangular in shape and is spaced inwardly of the plate 32 a distance slightly greater than the thickness of the front frame member 44. The frame member 44 includes a right angle frame portion 44a which abuts the rear frame plate 32 in the operating position of the device. A rectangular aperture 66 in the front frame member portion 44a permits passage of the head 64 of the pivot pin 62 only when the latch plate 60 is swung 90° to a horizontal position as shown in dot/dash lines in FIG. 2. When the latch plate 60 is in the vertical locking position, the front and rear frame portions 28 and 30 are secured together not only by the head 64 of the pivot pin 62 engaging the outer face of the frame member portion 44a, but in addition, the latch plate 60 includes a channel shaped flange 68 which receives the side edges of both the rear frame plate 32 as well as the front frame member 44a and effectively locks them together.

The latch plate is held in the vertical locking position by a lock screw 70 captively mounted on the locked plate adjacent its free end, which lock screw aligns with an aperture 71 in the rear frame plate 32 and engages the threaded bushing 72 on the front frame member portion 44a. A large knurled knob 74 on the lock screw 70 facilitates its rotation and threaded engagement with the bushing 72. With the screw 70 engaged in the bushing 72, rotation of the latch plate 60 is impossible and the front and rear frame portions are accordingly locked securely together. A compression spring 76 disposed between the screw knob 74 and the latch plate 60 holds the screw in flush relation with the latch plate when it is not threadedly engaged with the bushing 72, thereby permitting the pivotal motion of the latch plate into and out of its locked position.

A pair of identical cams 78 and 80 are pivotally mounted on the front frame portion 28 in vertical spaced relation between the frame members 42 and 44. The upper cam 78 is pivotally mounted on the rivet 46 while the lower cam 80 is pivotally mounted on the lower rivet 48. The cams 78 and 80 respectively include inwardly directed serrated cam surfaces 78a and 80a which are directed toward and extend into the channel 36 to a degree dependent upon the rotational position of the cams. A link 82 is pivotally connected by pivot pins 84 and 86 respectively to the outwardly extending ends of the upper and lower cams 78 and 80. An attachment ring 88 is pivotally connected to the pivot pin 86 and provides an attachment point for a worker's lanyard such as the lanyard 20 shown in FIG. 1. As shown in FIG. 3, the attachment ring may freely rotate with respect to the cam linkage.

Since the distance between the pivot pins 84 and 86 of the link is the same as the distance between the front frame pivots 46 and 48 of the cams, and since the distance between pivots 46 and 84 and 48 and 86 are also the same, a parallelogram linkage is established and accordingly the cams 78 and 80 will always remain in a parallel relationship. A vertical downward force on the attachment ring 88 will accordingly exert a rotational force on the cam, urging the cam surfaces 78a and 80a into the channel 36 and into engagement with a safety line disposed therewithin. A torsion spring 90 disposed around the upper pivot pin 84 and acting against the link 82 and upper cam 78 serves to bias the cam linkage into a rope engaging position and, in the absence of a line the channel 36, into the lowered cam linkage position shown in FIGS. 3-6.

For use of the present device, the front and rear frame portions are opened as shown in FIG. 6 and a safety line is placed in the channel 36 of the rear frame portion 30. The front and rear frame portions are then pivotally closed to capture the safety line in the channel 36. With the head 64 of the pivot pin 62 extending through the aperture 66, the latch plate 60 is swung into a vertical position and the lock screw 70 is then screwed into the bushing 72 by means of the knob 74, thus securing the front and rear frame portions in their operating position. The workman's lanyard is then clipped to the ring 88 to complete the safety connection of the worker to the safety line. Alternatively, the workman may initially attach his lanyard to the ring 88 prior to application of the device to the safety line.

Due to the action of the torsion spring 90, the cam linkage automatically moves toward a line engaging position as shown in FIG. 7a. This spring force coupled with the weight of the device is sufficient to hold the device at any desired position on the line without slippage. In this respect, it will be noted that the cam surfaces 78a and 80a engage the line at points substantially opposite the ribs 38 and 40. The line is accordingly gripped on both sides by the pressure effected by the cams.

Adjustment of the device to a higher or lower position on the safety line can be made simply by lifting up on the ring 88 or the link 82 to release the cam surfaces from engagement with the line. The simple release of the ring or link permits the spring to restore engagement of the cam faces with the line and thus lock the device in the released position.

Should the worker fall, as shown in FIG. 7b the worker's weight acting downwardly on the ring 88 and link 82 results in a greatly increased rotational force on the cams and the clamping force of the cam surfaces against the line will be commensurately increased. The parallogram linkage insures a substantially even distribution of the clamping force between the upper and lower cams. The linkage also insures a parallel relation of the gripped portion of the safety line to the force applied to it, namely the worker's weight, in contrast with prior art devices in which the gripping of the line at a single point resulted in a sharp angular change in the line's disposition in the event of a fall, and a consequent chafing and cutting of the line fibers at that point. With the present parallel linkage, the line remains vertical and the possibility of chafing or cutting of the line is minimized or eliminated.

To release the device from a line, the lock screw 70 is unscrewed and the latch plate 60 swung to a horizontal position, following which the frame portions may be opened to release the line from the channel.

In the perspective view of FIG. 8, the invention is shown in an exploded view with a slight modification in the form of a semi-circular sleeve 92 adapted to fit within the channel 36 to thereby narrow the channel and permit use of the device with a wire rope or cable 94. The sleeve 92, which is preferably of a soft metal may be bonded, welded or otherwise secured within the channel 36 to effectively decrease its diameter.

In addition to rope and cable, the device could also be used with safety rods which might, for example, be permanently affixed adjacent ladders on storage tanks, stacks and other high structures requiring frequent elevated access.

Manifestly, changes in details of construction can be effected by those skilled in the art without departing from the invention.

I claim:

1. A security device for the attachment of a safety belt lanyard to a vertically extending safety line or the like comprising:
    a frame assembly, said frame assembly comprising front and rear frame portions pivotally connected along adjacent side edges thereof,
    a vertical channel formed in said rear frame portion for receiving a safety line,
    a cam linkage mounted on said front frame portion, said cam linkage having cam surfaces directed into said channel,
    spring means for biasing said cam linkage surfaces toward said channel,
    an attachment ring connected to said cam linkage for connection of a lanyard thereto,
    a latch assembly for releasably locking said front and rear frame portions in an operating position, said latch assembly including a latch plate pivotally connected at one end thereof to one of said frame portions,
    a channel-shaped flange on said latch plate adapted to engage the free side edges of both frame portions in the locking position of said latch plate; and
    a locking screw captively connected to the free end of said lock plate and adapted to pass through the frame portion to which the locked plate is pivotally attached and threadedly engage the other said frame portion to secure said latch plate in the locked position.

2. The invention as claimed in claim 1 wherein a pivot pin fixed to said latch plate includes an inwardly spaced head having a non-symmetrical configuration which will pass through a similarly configured aperture in the opposed frame member in the open position of said latch plate but which will not pass therethrough in the locked position of the plate, thus serving to further secure the frame portions together in their operating position.

3. The invention as claimed in claim 2 wherein said head will pass through said aperture only when the latch plate has been rotated substantially 90° from its locking position.

4. The invention as claimed in claim 1 wherein said latch plate is pivotally secured to the rear frame portion.

5. The invention as claimed in claim 4 wherein said lock screw passes through an aperture in said rear frame portion in the locking position thereof.

6. The invention as claimed in claim 4 including a compression spring for biasing said lock screw toward a withdrawn position to facilitate pivotal movement of said latch plate.

7. The invention as claimed in claim 1 wherein said cam linkage comprises a pair of vertically spaced cams joined by a link to form a parallogram linkage.

* * * * *